Feb. 24, 1970     J. R. STOUFFER     3,496,764
SONIC INSPECTION APPARATUS
Filed March 27, 1967     2 Sheets-Sheet 1
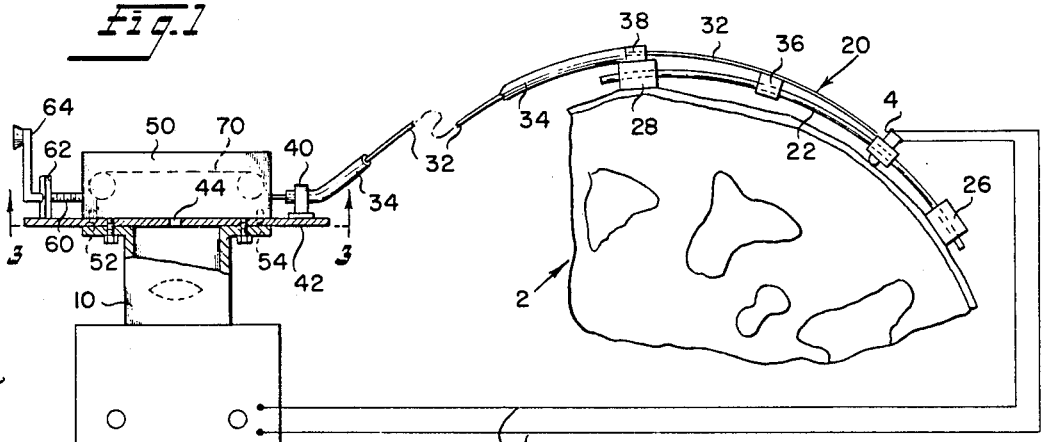
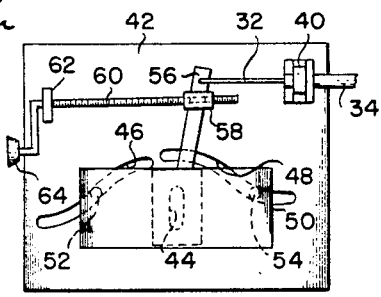
Fig. 2
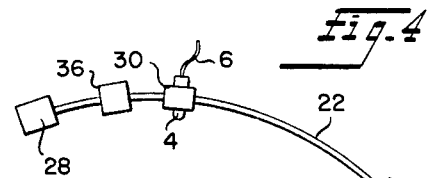
Fig. 3
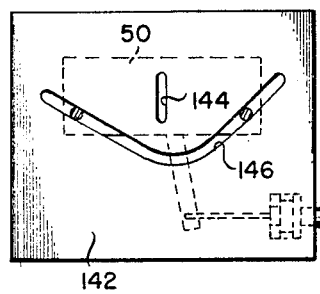
Fig. 5
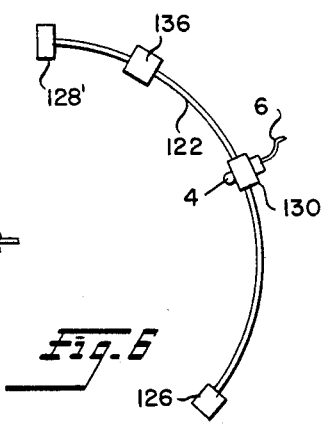
Fig. 6
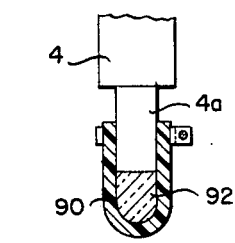
Fig. 8
INVENTOR
James R. Stouffer
BY Lawrence E. Laubscher
ATTORNEY

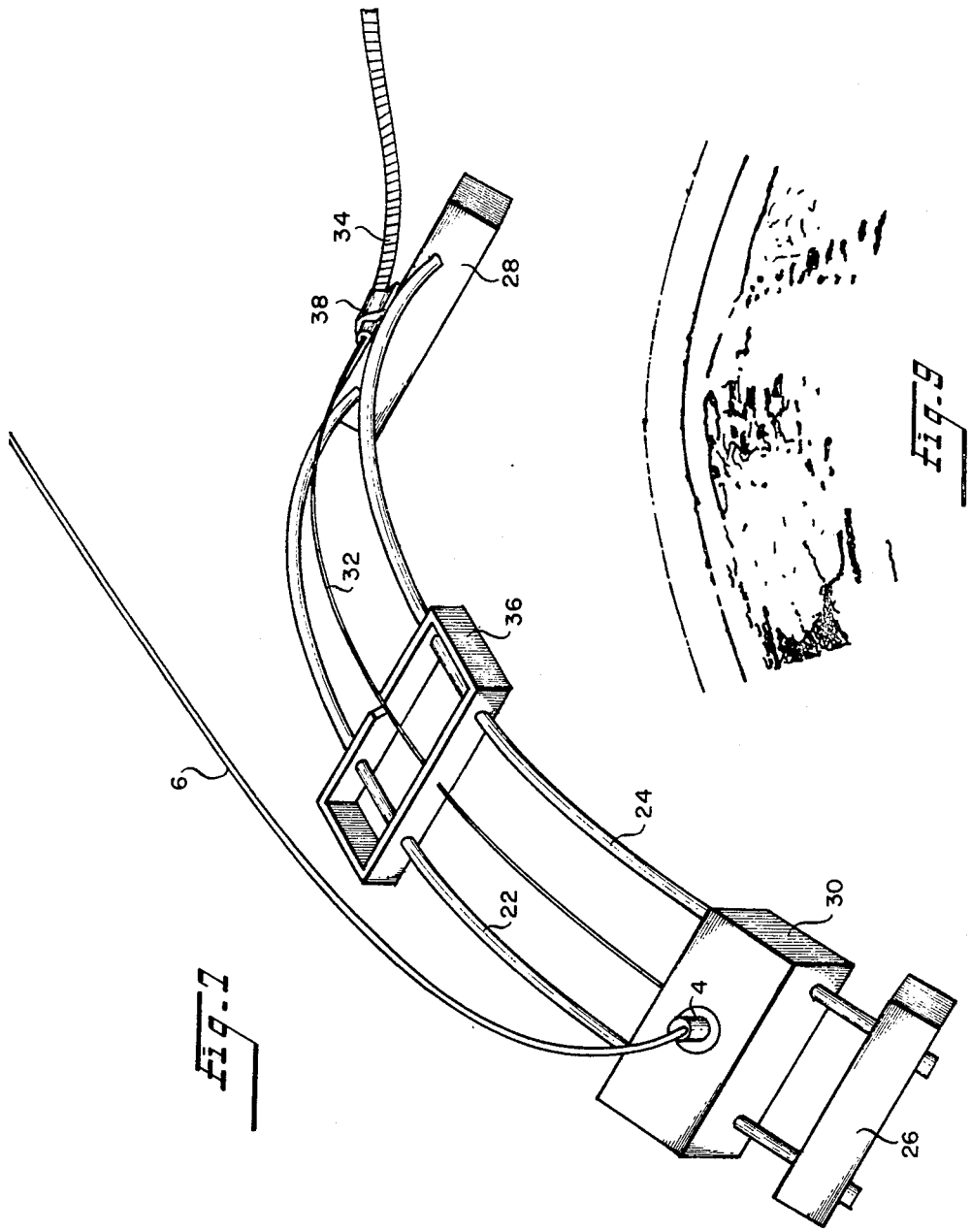

United States Patent Office 3,496,764
Patented Feb. 24, 1970

3,496,764
SONIC INSPECTION APPARATUS
James R. Stouffer, Ithaca, N.Y., assignor to Cornell Research Foundation, Inc., Ithaca, N.Y., a corporation of New York
Filed Mar. 27, 1967, Ser. No. 626,333
Int. Cl. G01n 9/24
U.S. Cl. 73—67.8    9 Claims

ABSTRACT OF THE DISCLOSURE

Sonic inspection apparatus including non-uniform empirically-designed companion transducer guide means and camera guide means. As the sonic transducer is guided along a non-uniform fixed path relative to the outline of the cross section of a live mammal being inspected, the camera is correspondingly rotated relative to an A-mode read-out whereby an accurate photographic replica of the cross section of the mammal is achieved.

---

Various types of ultrasonic apparatus for examining the internal structure of humans and animals are, of course, well known in the prior art, as evidenced by the patents to Simjian No. 2,763,153, Pohlman No. 2,752,914, Brown No. 3,086,390 and Howry No. 3,023,611. The use of ultrasonic techniques for inspecting live cattle for fat thickness has long been proposed, particularly in connection with hogs (which contain a relatively high percentage of fat, so that the fat indication provides a reasonable indication of carcass composition).

In order to obtain a more accurate indication of total carcass value, it has been proposed to measure muscle as well as fat by the use of ultrasonic methods. Traditionally cattle and hogs have been evaluated by the thickness of fat and the size of the longissimus dorsi muscle over the middle of the back. In cattle, the use of A-scan techniques has been proposed for measuring the thickness of fat and muscle in the area of the last rib. In hogs, these measurements are taken in the area of the tenth rib. Owing to the great variation in the shape of muscle, it was apparent that a single thickness measurement did not produce a sufficient accurate prediction of the total amount of lean in the carcass.

In recent years it has been proposed to inspect mammals in general, and livestock in particular, by the use of a simple commercially available A-mode ultrasonic testing apparatus. In accordance with the present invention, a pictorial cross section of the animal is obtained by mounting a camera over the cathode ray tube of the ultrasonic ranging unit, so that the A-mode read-out is photographically recorded. However, in view of the non-uniform path followed by a sonic transducer in its travel across the surfaces of animals, it is extremely difficult to effect correlation between the simultaneous movement of the transducer and that of the camera.

The primary object of the present invention is to provide sonic inspection apparatus including a separate empirically-designed transducer guide means and a companion camera guide means for each type of curved surface of mammal, the cross section of which is to be tested. Each transducer guide means is adapted for manual positioning upon the surface of the desired cross section of a given mammal, said transducer guide means having in longitudinal cross section a given non-uniform curve corresponding with that particular outline of that particular mammal. For example, the transducer guide means for backs of cattle and hogs would normally have flat and steep configurations, respectively. The camera guide means comprises a plate adapted for mounting upon the housing of an ultrasonic range unit and including cam track means for guiding the camera—relative to a fixed A-mode read-out—for generally pivotal movement along an empirical path corresponding with the empirical path of travel of the transducer.

A more specific object of the invention is to provide apparatus of the type described above wherein the transducer guide means includes empirically-designed curved guide rods corresponding in configuration with and spaced from the surface of the mammal being tested. To compensate for minor irregularities in the surface of mammals of a given type, the transducer is provided with flexible fluid filled contact means in continuous engagement with the mammal skin surface.

Other objects and advantages of the invention will become apparent from a study of the following specification when considered in conjunction with the accompanying drawing, in which:

FIG. 1 is a diagrammatic illustration of the sonic livestock inspection apparatus;
FIG. 2 is a top plan view of the camera and ultrasonic range means;
FIG. 3 is a sectional view taken along line 3—3 of FIG. 1;
FIG. 4 illustrates transducer guide means designed for use with the camera guide means of FIG. 3, the transducer guide means having a relatively flat curved configuration;
FIGS. 5 and 6 illustrates corresponding camera guide means and transducer guide means, respectfully, the transducer guide means having a relatively steep curved configuration;
FIG. 7 is a perspective view of the transducer guide means of FIG. 1;
FIG. 8 illustrates in detailed cross-section a transducer provided with improved mammal engaging contact means; and
FIG. 9 is a schematic illustration of the cross-section of an inspected animal.

Referring now to FIGS. 1–4, the apparatus for sonically inspecting a mammal 2 of a given species includes a conventional sonic transducer 4 electrically connected by conductors 6 with a conventional sonic range unit 8 for transmitting and receiving sonic energy into and from the body of the mammal, respectively. The range unit 8 contains cathode ray tube means (not shown) for providing an intensity-modulated A-mode read-out, as is conventional in the art. Examples of the range unit and transducer are the Sonoray Ultrasonic Animal Tester Model 12 and Type Zs Ultrasonic Transducer market by Branson Instruments, Inc., Bethel, Conn.

In accordance with the present invention the transducer 4 is mounted for sliding movement upon transducer guide means 20 which are adapted for manual positioning upon the middle of the back of the live animal (adjacent and longissimus dorsi muscle). As shown in FIGS. 1, 4, and 7, the transducer guide means comprises a pair of spaced parallel guide rods 22, 24 the ends of which are rigidly connected with supporting blocks 26, 28 that seat upon the back surface of the animal 2. The transducer 4 is carried by a slide block 30 that is mounted for sliding movement upon the guide rods 22, 24 by means of the inner wire 32 of a coaxial cable 34. Preferably an intermediate support block 36 is slidably mounted on the rods 22, 24 to stabilize the intermediate portion thereof and also to support the wire 32.

At the one end of the outer sleeve 34 of coaxial cable is secured by bracket 38 to the block 28. The other end of the sleeve 34 is secured by bracket 40 (FIG. 2) to a plate 42 that is secured to a conventional lens housing 10 that is attached to the sonic range means 8. The plate 42 contains a slot 44 that is in optical alignment with the cathode ray tube and a pair of cam tracks 46, 48 in the form of through slots.

Mounted for generally-pivotal movement upon the plate 42 is a camera film housing 50 carrying a pair of parallel pins 52, 54 that extend into the cam slots 46 and 48, respectively. Rigid extension 56 extends from camera film housing 50 parallel with the plate 42 and is connected with the free end of wire 32. The extension carries a nut 58 that is threadedly connected with an operating screw 60 rotatably supported in bearings 62 carried by plate 42. As will be described below, rotation of screw 60 by operating handle 64 (or other suitable, means) effects simultaneously guided movement of camera film housing 50 relative to the A-mode read-out slot 44, and guided movement of transducer 4 relative to the animal 2. The camera means includes conventional shutter operating means, not shown, for exposing the film 70 to the image produced at the read-out slot 44 by the lens means contained in the camera lens housing 10. The slot 44 minimizes extraneous light and limits the exposure on the film to the image of the trace on the cathode ray tube. As indicated above, the cam tracks 46, 48 have such configurations as to effect an empirical generally pivotal (i.e., a combined translational and rotational) movement of the camera 50 relative to the slot 44 that corresponds with the empirical path of travel of the transducer along the guide means 22, whereby the image of the A-scan read-out is recorded on the film.

Operation

Assume that the sonic apparatus thus far described is to be used for the inspection of a live steer that is restrained in a chute or stall. The transducer guide means 20 is manually positioned transversely across the back of the animal adjacent the longissimus dorsi muscle, the shutter mechanism of the camera is actuated (by conventional means, not shown) and the screw 60 is rotated, whereupon extention 56 is actuated to initiate rotation of camera 50 relative to the A-mode read-out 44, and to initiate displacement of transducer 4 along guide means 20.

As the transducer 4 is displaced across the back portion of the steer, sonic pulses are periodically transmitted into the animal tissue, and reflected signals are indicated by the A-mode read-out means. These reflected signals are indicative of the change in character (i.e., border zones) between muscle and fat, muscle and bone, lean and fat, and so forth, thereby giving an accurate index of the quantative composition of the carcass. As shown in FIG. 9, each reflected signal produces a visual indication on the A-mode read-out that is recorded on the film of the camera. Since the camera is moved along on empirically determined curvilinear path in exact correspondence with the travel of the guided transducer 4 along an identically determined curvilinear path, an accurate pictorial representation of the cross-section of the animal is produced. Furthermore, since the camera is positioned at a fixed focal length with a moveable film back mounted on a plate engineered to cause the camera to follow the exact same curvature as the transducer, the movement will be linear and proportional both for the transducer and the film back. Consequently, the screw drive mechanism causes continuous, smooth movement of the film back while the shutter is open on time exposure from the beginning to the end of movement. This permits the synchronized sending and receiving of signals from various interfaces of the test object and the recording of the signals from the cathode-ray tube for an accurate pictorial representation of the test body.

In accordance with a characterizing feature of the present invention, in the situation where the livestock to be inspected is a hog, a transducer guide means having a relatively steep curve in longitudinal cross section is provided as shown in FIG. 6, the associated plate 142 (FIG. 5) having a corresponding empirically-designed guide track 146 for causing the rotation of camera 50 to correspond with the guided movement of the transducer 4. It is apparent that for each type of curved surface of a mammal, a separate empiracally-designed transducer guide means and a correspondingly designed camera glide plate are provided.

In each of the transducer guide means used in the inspection of various species of mammals, the guide rods are parallel with and uniformly spaced from the surface of the animal. The longitudinal cross sectional configurations of the guide means are empirically obtained (owing to the non-uniform configuration of the animals) and thus follow no given exact formula. However, since mammals have different sizes and characteristics, it may be desirable in accordance with the present invention, to provide the sonic transducer with flexible contact means in continuous contact with the animal. Referring to FIG. 8, it will be noted that a flexible housing 90, formed of rubber or a synthetic material such as atabrine rubber, is fitted upon the transducer end 4a to define a chamber 92 that is filled with a suitable fluid, such as paraffin oil. Consequently, during the use the housing 90 is maintained in continuous communication with the animal, whereby the sonic waves always pass through the fluid and never through atmosphere, thereby assuring a highly accurate measurement.

While the specific embodiment described and taught hereinabove has been described as applied to particular cross sections of animals, it should be clear to those skilled in the art that those teachings have equivalent applicability to the examination of cross sections of human beings.

What is claimed is:

1. In an ultrasonic mammal inspection apparatus of the type including ultrasonic transducer means for transmitting and receiving pulse sound energy, ultrasonic range means connected with said transducer means for providing an A-mode read-out of the reflected energy sensed by said transducer means, and camera means including a film housing portion for photographically recording the A-mode read-out; the invention which comprises transducer guide means adapted for placement upon the mammal for guiding the transducer means along a first empirical non-uniform curved path corresponding to the outline of the cross section of the general species of the mammal being examined;

camera guide means for guiding at least the film housing portion of said camera means for generally pivotal movement in a plane parallel with and spaced from said A-mode read-out along a second empirical path corresponding with the first empirical guided path of said transducer means; and means for simultaneously displacing said transducer and said camera film housing portion along their respective guided paths.

2. Apparatus as defined in claim 1, wherein said camera guide means comprises a guide plate adapted for connection with said ultrasonic range means adjacent, parallel with and spaced from the A-mode read-out thereof said guide plate containing a slot opposite and in optical alignment with the A-mode read-out, and at least one cam track;

said camera film housing portion including cam follower means in engagement with said cam track, said cam track being so arranged relative to said slot that said camera film housing portion is displaced in a generally pivotal empirical manner relative to said slot.

3. Apparatus as defined in claim 2, wherein said cam track comprises at least one through slot contained in said plate, and wherein said cam follower means comprises a pair of parallel projections extending from said camera film portion within said slot.

4. Apparatus as defined in claim 3, wherein said cam track means comprises a pair of tracks each receiving one of said projections, respectively.

5. Apparatus as defined in claim 1, wherein the longitudinal cross-sectional configuration of said transducer guide means defines a relatively steep curve.

6. Apparatus as defined in claim 1, wherein the longitudinal cross-sectional configuration of said transducer guide means defines a relatively flat curve.

7. Apparatus as defined in claim 1, wherein said transducer guide means comprises a pair of spaced end blocks adapted for seating engagement with the back portion of the mammal, and curved guide rod means extending between said end blocks in parallel spaced relation with the surface of said back portion; and further including means supporting said transducer for sliding engagement upon said guide rod means, and flexible contact means carried by said transducer for continuous engagement with the surfaces of the mammal.

8. Apparatus as defined in claim 7, wherein said flexible contact means comprises a resilient wall defining a chamber in communication with said transducer, and fluid filling said chamber.

9. In an utrasonic mammal inspection apparatus of the type including ultrasonic transducer means for transmitting and receiving pulse sound energy, ultrasonic range means connected with said transducer means for providing an A-mode readout of the reflected energy sensed by said transducer means, and means including a lens portion and a film supporting portion for photographically recording the A-mode read-out; the invention which comprises transducer guide means adapted for placement upon the mammal for guiding the transducer means along a curved path corresponding to the surface of the cross section of the general species of mammal being examiner; and means for displacing one of said photographic recording portions relative to the other in a plane parallel with and spaced from said A-mode read-out means in correspondence to, and simultaneously with, the movement of said transducer means along said guide means, thereby to scan and record a replica of the cross section of the mammal.

References Cited
UNITED STATES PATENTS

| | | | |
|---|---|---|---|
| 3,023,611 | 3/1962 | Howry | 73—67.8 |
| 3,225,136 | 12/1965 | Furon. | |
| 3,308,652 | 3/1967 | Appel et al. | 73—67.8 XR |

FOREIGN PATENTS

| | | |
|---|---|---|
| 696,920 | 9/1953 | Great Britain. |

JAMES J. GILL, Primary Examiner

J. P. BEAUCHAMP, Assistant Examiner